United States Patent
Toyoda et al.

(10) Patent No.: US 8,636,159 B2
(45) Date of Patent: Jan. 28, 2014

(54) LAMINATED BOTTLE

(75) Inventors: Tamotsu Toyoda, Tokyo (JP); Tomoyuki Ozawa, Tokyo (JP); Hiroshi Hosokoshiyama, Tokyo (JP); Hideaki Soyama, Matsudo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 97 days.

(21) Appl. No.: 12/867,991

(22) PCT Filed: Apr. 20, 2009

(86) PCT No.: PCT/JP2009/057876
§ 371 (c)(1),
(2), (4) Date: Aug. 17, 2010

(87) PCT Pub. No.: WO2009/133783
PCT Pub. Date: Nov. 5, 2009

(65) Prior Publication Data
US 2010/0314281 A1    Dec. 16, 2010

(30) Foreign Application Priority Data
Apr. 30, 2008  (JP) .................................. 2008-119127

(51) Int. Cl.
*B65D 1/02*  (2006.01)

(52) U.S. Cl.
USPC ...... 215/12.2; 206/524.6; 215/12.1; 215/382; 215/383; 220/660; 428/35.7

(58) Field of Classification Search
USPC ........ 215/12.1, 12.2, 382, 383; 264/513, 515; 428/35.7; 206/524.6; 220/672
See application file for complete search history.

(56) References Cited

U.S. PATENT DOCUMENTS

| | | | | |
|---|---|---|---|---|
| 4,646,925 | A | * | 3/1987 | Nohara ..................... 428/542.8 |
| 4,980,211 | A | * | 12/1990 | Kushida et al. ............. 428/36.7 |
| 5,116,565 | A | * | 5/1992 | Yoshino ....................... 264/532 |
| 5,464,106 | A | * | 11/1995 | Slat et al. ..................... 215/12.1 |
| 5,676,267 | A | * | 10/1997 | Slat et al. ..................... 215/12.1 |
| 5,927,525 | A | * | 7/1999 | Darr et al. .................... 215/12.2 |
| 2011/0036850 | A1 | * | 2/2011 | Sugai et al. ................... 220/660 |
| 2011/0108505 | A1 | * | 5/2011 | Toyoda et al. ............... 215/12.2 |

FOREIGN PATENT DOCUMENTS

| | | | |
|---|---|---|---|
| JP | 04296526 A | * 10/1992 | ................. 428/542.8 |
| JP | A-5-309648 | 11/1993 | |
| JP | B2-6-59681 | 8/1994 | |
| JP | A-2001-88817 | 4/2001 | |

OTHER PUBLICATIONS

First Office Action Notification issued in Chinese Patent Application No. 200980110207.1, mailed Aug. 18, 2011, with English language translation.

(Continued)

*Primary Examiner* — Anthony Stashick
*Assistant Examiner* — Cynthia Collado
(74) *Attorney, Agent, or Firm* — Oliff & Berridge, PLC

(57) ABSTRACT

A laminated bottle with a gas barrier resin layer arranged between polyester resins layers is provided. The gas barrier resin layer includes a plurality of quadrangular segments with two sides extending along the bottle axis and two sides extending around the bottle axis, wherein the segments are arranged at a distance to each other via connecting layers which connect the inner layer and the outer layer.

4 Claims, 3 Drawing Sheets

(56) References Cited

OTHER PUBLICATIONS

European Search Report dated Apr. 21, 2011 in corresponding European Application No. 09738720.3.
Jun. 29, 2012 Office Action issued in Chinese Patent Application No. 200980110207.1 (with translation).
Aug. 28, 2012 Office Action issued in Japanese Patent Application No. 2008-119127 (with translation).
Oct. 22, 2012 Office Action issued in Korean Patent Application No. 10-2010-7018973 (with translation).
Feb. 26, 2013 Office Action issued in Japanese Patent Application 2008-119127 (with translation).
International Search Report dated Jul. 21, 2009 in corresponding International Application No. PCT/JP2009/057876 (with translation).
Dec. 26, 2011 Office Action issued Chinese Patent Application No. 200980110207.1 (with translation).
Office Action issued in Korean Patent Application No. 10-2010-7018973; mailed Mar. 14, 2012; with English-language translation.
Office Action issued in Canadian Patent Application No. 2,719,380; mailed Apr. 12, 2012.

* cited by examiner

LAMINATED BOTTLE

TECHNICAL FIELD

The invention relates to a multi-layered bottle with excellent gas barrier and oxygen absorption properties, and also to a technique to prevent a delamination of layers of a bottle.

RELATED ART

A multi-layered bottle is already known, wherein its inner layer and outer layer are composed of polyester resin or the like, and a gas barrier resin layer is interposed between the inner layer and the outer layer, so that oxygen impermeability and oxygen absorption properties are exerted when the contents of the bottle tend to be easily oxidized, and also permeation of carbon dioxide is prevented when the contents of the bottle are carbonated drinks. (See Patent Document 1 as an example.)

Patent Document 1 JP 6059681 B2 (Tokko Hei 06-59681)

DISCLOSURE OF THE INVENTION

However, if the inner and outer layers are composed of polyester resin, a delamination can be caused between polyester resin and ethylene-vinyl alcohol copolymer (EVOH) or nylon resin (polyamide) that are commonly used as a gas barrier resin layer. In such a case, it is a problem that the appearance of the bottle as a container can be spoiled and the product value is deteriorated.

An object of the present invention is, therefore, under consideration of the above-mentioned fact, to provide a multi-layered bottle, wherein a delamination between the inner/outer layers and the gas barrier resin layer is restrained.

The invention provides a laminated bottle with a gas barrier resin layer arranged between an inner layer and an outer layer, wherein segments of the gas barrier layer are arranged at a distance to each other at least in an area from a shoulder part to a barrel part of the bottle.

According to the invention, the gas barrier resin layer may comprise a plurality of strip segments extending along the bottle axis and arranged at a distance to each other around the bottle axis.

Further, according to the invention, the gas barrier layer may comprise a plurality of ring segments surrounding the bottle axis and arranged at a distance to each other.

Moreover, according to the invention, the gas barrier layer may comprise a plurality of quadrangular segments with two sides extending along the bottle axis and two sides extending around the bottle axis, and the segments can be arranged at a distance to each other.

According to the invention, a laminated bottle in which an inner layer and an outer layer are composed of polyester resin and at least an area of the bottle from a shoulder part to a barrel part comprises 3 layers can be used.

Resins composing the inner layer and the outer layer of the bottle include polyesters such as polyethylene terephthalate (PET) resin and polyethylene naphthalate (PEN) resin, and polyolefines such as polyethylene resin (PE) and polypropylene (PP) resin. Gas barrier resins include, for example, ethylene-vinyl alcohol copolymer, metaxylylene group containing polyamide resin, nylon resin and the like. Each of the resins mentioned above can be used alone or as a mixture with other resins.

According to the invention, the inner and outer layers of the bottle composed of the same resin and are connected to each other between the adjacent segments of the gas barrier resin layer, thereby binding the periphery of the gas barrier resin layer.

As a result, a delamination between the inner/outer layers and the gas barrier resin layer can be suppressed. Even if the delamination is still caused, deterioration of the physical properties of the bottle and spoiling its appearance can be effectively avoided, since the ratio of the surface area occupied by an individually arranged segment of the gas barrier resin layer on the surface of the container is reduced.

Thus, according to the invention, a novel laminated bottle with an excellent contour can be provided.

According to the invention, when the gas barrier layer comprises strip segments extending at least in an area from a shoulder part to a barrel part and arranged at a distance to each other around the bottle axis, the gas barrier resin layer is substantially segmented in a circumferential direction around the bottle axis by the inner and outer layers (a connecting layer) extending along the bottle axis.

Thus, since the surface area of a strip segment is reduced with respect to that of the bottle and each circumferential edge of the strip segment is bound by a connecting part of the inner and outer layers, even if a delamination is caused, it can be suppressed to a small region.

According to the invention, when the gas barrier layer comprises ring segments surrounding the bottle axis and arranged at a distance to each other at least in the area from a shoulder part to a barrel part, the gas barrier resin layer is substantially segmented in a direction of the bottle axis by the inner and outer layers (the connecting layers).

Thus, since the surface area of a ring segment is reduced with respect to that of the bottle, even if a delamination is caused, it can be suppressed to a small region.

Further, according to the invention, when the gas barrier resin layer comprises a plurality of quadrangular segments with two sides extending along the bottle axis and two sides extending around to the bottle axis and the segments are arranged at a distance to each other at least in the area from a shoulder part to a barrel part, the gas barrier resin layer is substantially segmented in the form of a lattice by the inner and outer layers (the connecting layers) extending along the bottle axis and by the annular inner and outer layers (the connecting layers) surrounding the bottle axis.

That is, since the surface area of a quadrangular segment is reduced with respect to that of the bottle in this case as well, even if a delamination is caused between layers, it can be suppressed to a small region.

BRIEF DESCRIPTION OF THE DRAWINGS

FIG. 1 (b) is a cross-sectional view of a multi-layered bottle according to the first embodiment of the invention taken along line A-A in FIG. 1 (a);

FIG. 2 (b) is a cross-sectional view of a multi-layered bottle according to the second embodiment of the invention taken along a line B-B.

Figure 1:
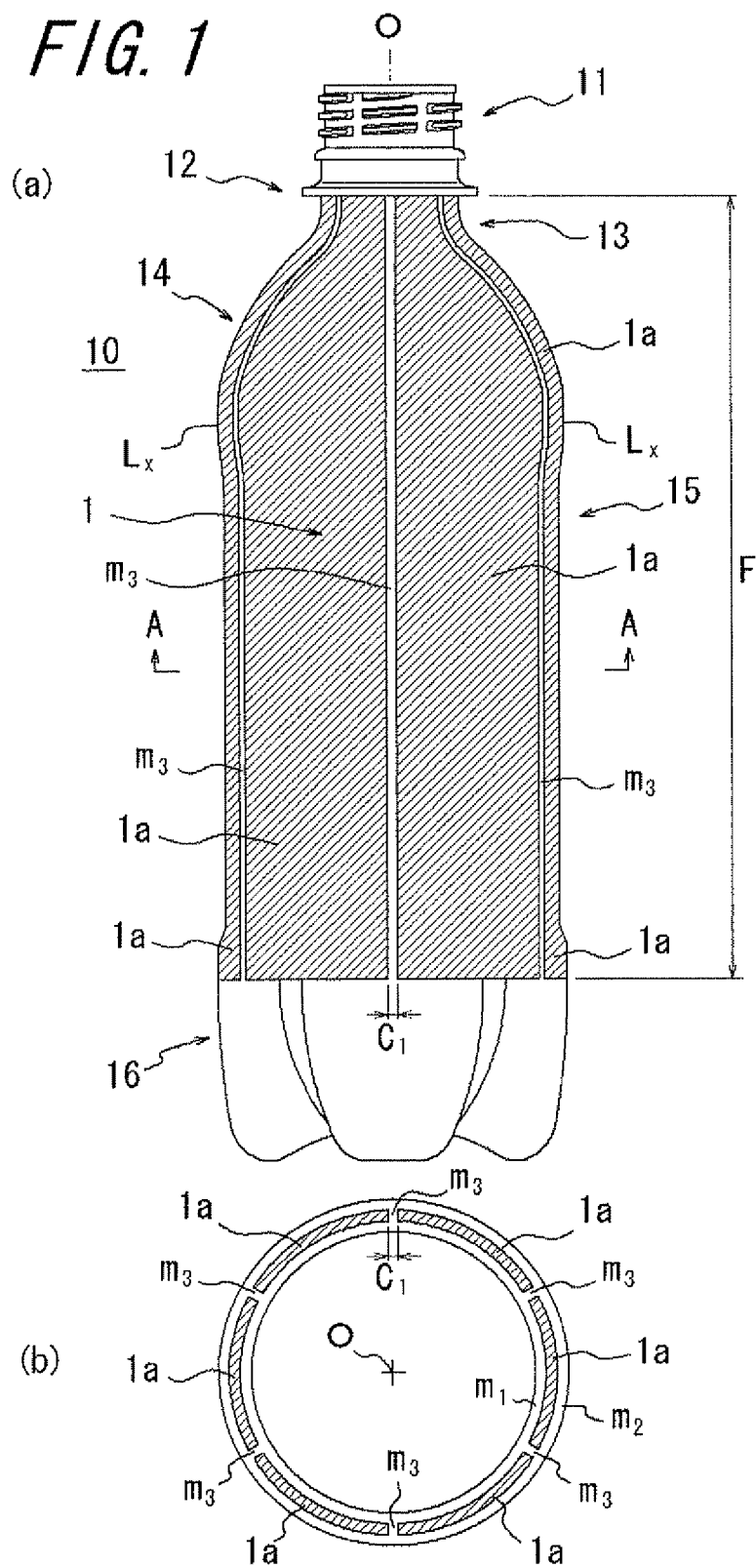
FIG. 1 (a) is a side view of a multi-layered bottle according to the first embodiment of the invention.

REFERENCE SYMBOLS 1 gas barrier layer
1a strip segment 2 gas barrier layer
2a ring segment
3 gas barrier layer
3a quadrangular segment
10 multi-layered bottle
11 mouth part
12 annular part
13 neck part
14 shoulder part
15 barrel part
16 bottom part
$C_1$, $C_2$ distance
F an area from the neck part to the barrel part
m PET resin layer (polyester resin layer)
$m_1$ inner layer (polyester resin layer)
$m_2$ outer layer (polyester resin layer)
$m_3$, $m_4$ connecting layer (polyester resin layer)

BEST MODE FOR CARRYING OUT THE INVENTION

A multi-layered bottle according to the invention is described below with reference to the drawings.

FIGS. 1 (a) and (b) are a side view and a sectional view along a line A-A, respectively, of a multi-layered bottle of the first embodiment according to the invention.

A multi-layered bottle 10, referred to as "bottle" in the following, comprises a mouth part 11 onto which a cap (not shown) is removably threaded, a neck part 13 connected to the mouth part 11 via an annular part 12 and having substantially the same diameter as that of the mouth part 11, a shoulder part 14 connected to the neck part 13 and having a gradually enlarged diameter, a barrel part 15 connected to the shoulder part 14 and having an enlarged diameter with a partially reduced diameter as well as a petal-shaped bottom part 16 connected to the barrel part 15.

The bottle 10 has a gas barrier resin layer 1 interposed between PET resin layers m that is mainly composed of PET resin. Thereby, the PET resin layers m comprise an inner layer $m_1$ which is arranged inside of the gas barrier resin layer 1, and an outer layer $m_2$ which is arranged outside of the gas barrier resin layer 1 of the bottle.

The gas barrier resin layer 1 comprises a plurality of strip segments 1a extending along a bottle axis O in a area F from the neck part 13 to the barrel part 15, as indicated with a shaded area in FIG. 1. More particularly, the strip segments 1a extend along a ridgeline Lx (located on the right and left sides in FIG. 1 and forming the contour of the bottle) in a side view of the bottle 10.

As shown in FIG. 1 (b), the gas barrier resin layer 1 in this embodiment is designed in such a manner that six pieces of strip segments 1a composing the gas barrier resin layer 1 are positioned at a distance $C_1$ (only one distance $C_1$ is indicated in FIG. 1 (b)) around the bottle axis O. Thereby, as shown in FIG. 1 (a), the inner layer $m_1$ and the outer layer $m_2$ are connected integrally with a connecting layer $m_3$ composed of PET resin and extending in parallel with the ridgeline Lx.

According to this embodiment, the ration of the surface area occupied by a strip segment 1a in the surface area of the bottle 10 which is composed of PET resin layer m is reduced, and each circumferential edge of the strip segment 1a is bound by the connecting layer $m_3$ arranged between strip segments.

Thus, a delamination between the inner layer $m_1$ or the outer layer $m_2$ and the gas barrier resin layer 1 (comprising strip segments 1a) is suppressed. Even if the delamination between the layers is caused, spoiling of appearance of the bottle can be effectively avoided, since the portion of the surface area occupied by a strip segment 1a is reduced with respect to the surface area of the bottle 10.

Therefore, in the present embodiment, a novel laminated bottle with an excellent contour can be provided.

Figure 2:
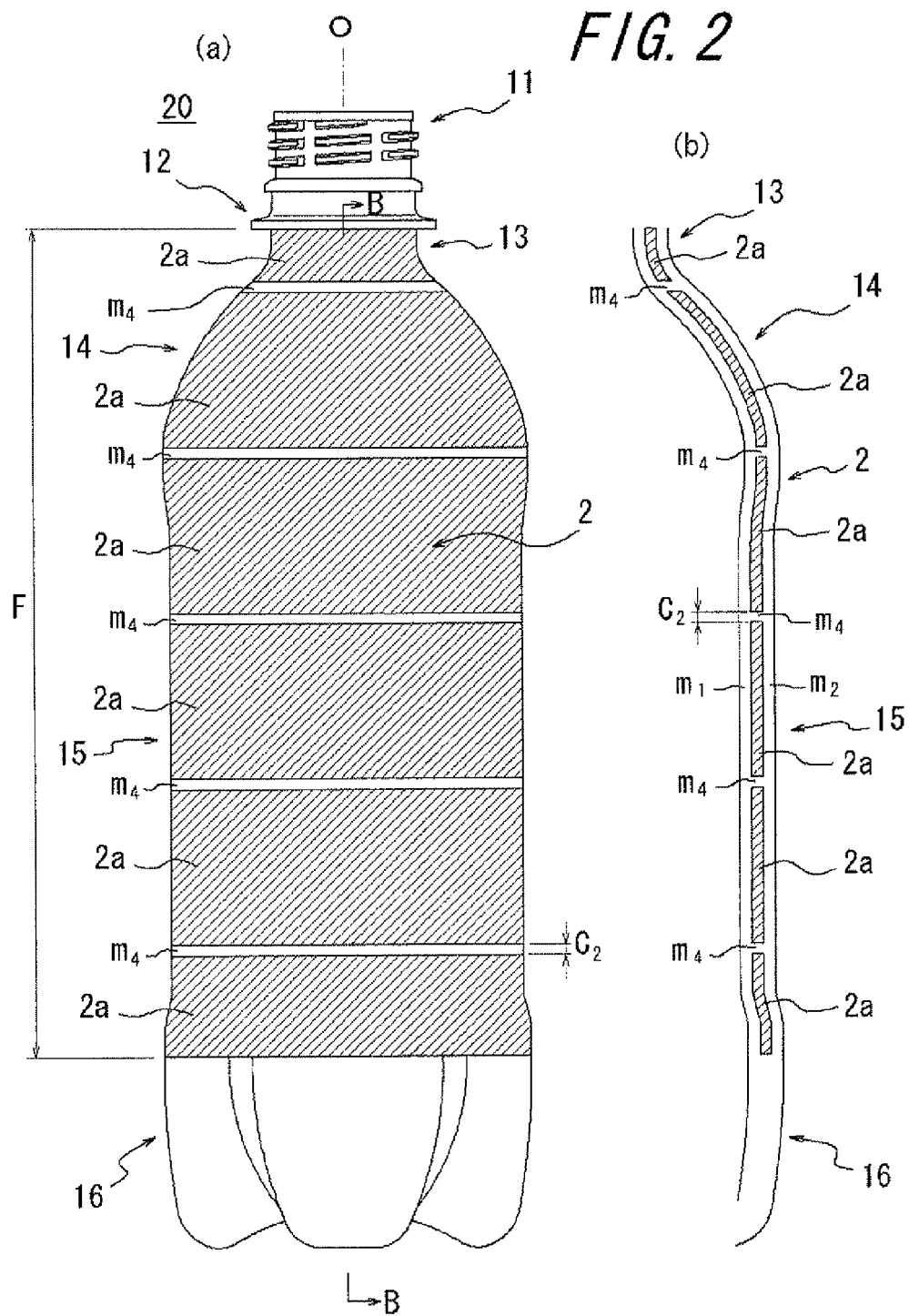
FIG. 2 (a) is a side view of a multi-layered bottle according to the second embodiment of the invention.

FIGS. 2 (a) and (b) are a side view and a sectional view along a line B-B, respectively, of a laminated bottle of the second embodiment according to the invention. Parts corresponding to the parts in the first embodiment are indicated with the same reference numerals and are not further described below.

A gas barrier resin layer 2 according to the invention comprises a plurality of ring segments 2a surrounding the bottle axis O, as indicated by the shadowed area. The ring segments 2a are composed of a gas barrier resin and formed as an endless loop.

As shown in FIG. 2 (a), the gas barrier resin layer 2 according to this embodiment is formed by positioning six pieces of ring segments 2a along the bottle axis O at a distance $C_2$ (only one distance $C_2$ is indicated in FIG. 2 (2).) to each other. Thereby, the inner layer $m_1$ and the outer layer $m_2$ are connected integrally by a connecting layer $m_4$ which is composed of PET resin and extends in parallel around the bottle axis O. That is, the ring segments 2a are arranged at a distance via the connecting layer $m_4$ to each other within the area F of the bottle 20.

Also in the present embodiment, the portion of the surface area occupied by the ring segments 1a is smaller than the surface area of the bottle 20 made of PET resin layer m, and each circumferential edge of the segments of the gas barrier resin layer 2 is bound by the connecting layer $m_4$ that is arranged between segments of gas barrier resin layer 2.

Thus, a delamination between the inner layer $m_1$ or the outer layer $m_2$ and the gas barrier resin layer 2 (ring segments 1a) is suppressed. Even if the delamination between the layers is caused, spoiling of appearance of the bottle can be effectively avoided, since the portion of the surface area occupied by a ring segment 2a is reduced with respect to the surface area of the bottle 20.

Thus, a novel laminated bottle with an excellent contour can be also provided in this embodiment.

Figure 3:
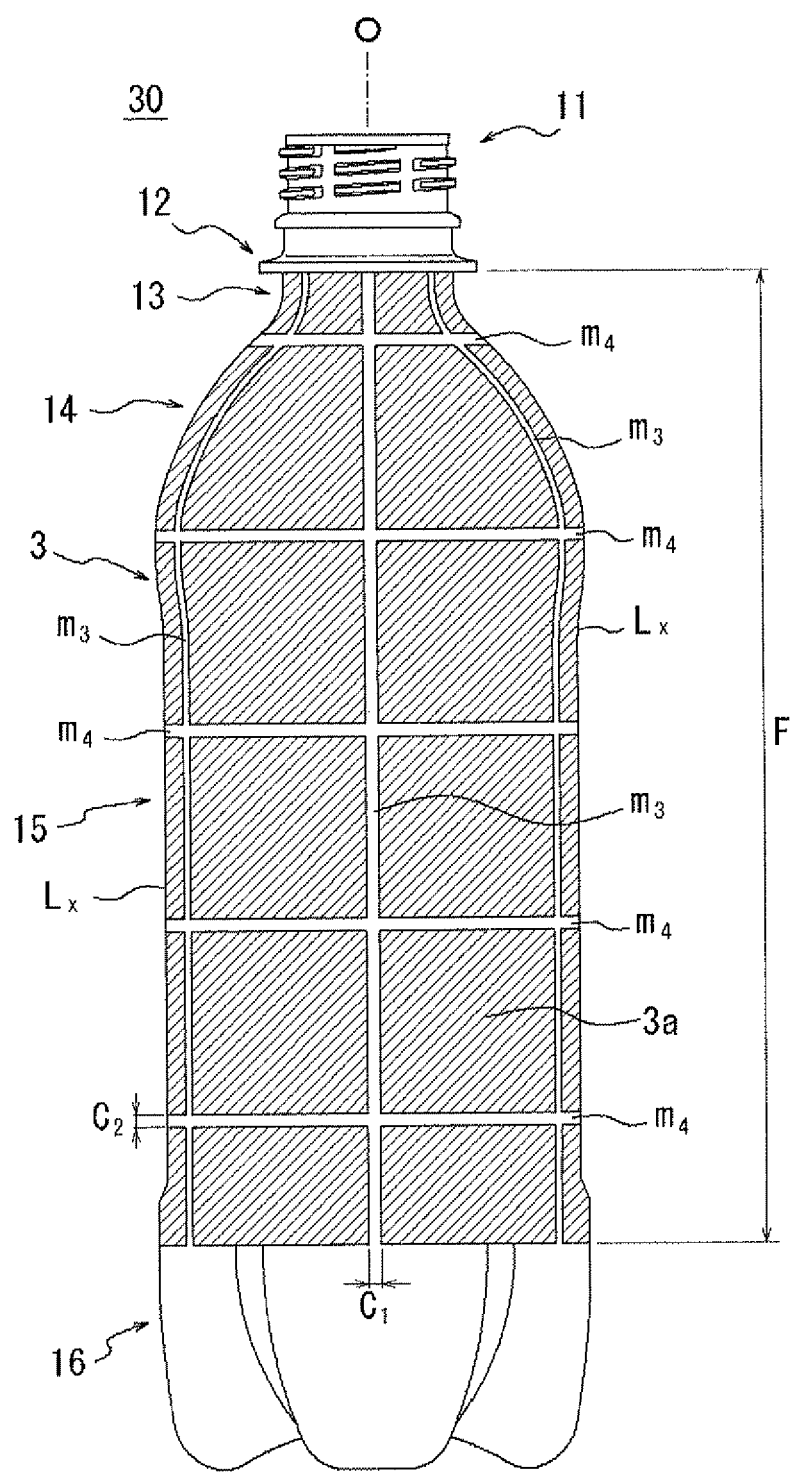
FIG. 3 is a side view of a multi-layered bottle according to the third embodiment of the invention.

Moreover, FIG. 3 shows the third embodiment of a multi-layered bottle 30 according to the invention. Parts corresponding to the parts in the first embodiment are indicated with the same reference numerals and are not further described below.

This embodiment is a combination of the first embodiment and the second embodiment.

The gas barrier layer 3 comprises a plurality of quadrangular segments 3a with two sides extending along the bottle axis and two sides extending around the bottle axis O. As shown in FIG. 3, the quadrangular segments 3a comprise two sides extending along the ridgeline Lx and two sides extending around the bottle axis.

The gas barrier resin layer 3 is formed by arranging 36 (-6*6) pieces of quadrangular segments 3a at a distance $C_1$ around the bottle axis O and a distance $C_2$ along the bottle axis to each other, as shown in FIG. 3. Thereby, the inner layer $m_1$ and the outer layer $m_2$ are connected integrally by means of the connecting layers $m_3$, $m_4$ in the form of a lattice. Thus, the quadrangular segments 3a are arranged within the area F of the bottle 10 at a distance to each other via the connecting layers $m_3$, $m_4$.

In each of the above-described embodiments, the gas barrier layers 1, 2, 3 are arranged in the area F from the bottle neck 13 to the bottle barrel 15 in order to reduce the amount of gas barrier resin to be used, which may cause an increase of cost. This measure was taken, since the inventors noticed that there was less need to arrange a gas barrier resin around the bottom 16 of the bottle that was usually thick. However, this structure does not exclude the possibility of arranging the gas barrier layer 1-3 all over the bottle, or arranging it only on the barrel part 15, or on both shoulder part 14 and barrel part 15.

According to the invention, the location and the number of strip segments 1*a*, ring segments 2*a*, quadrangular segments 3*a* are not restricted to the embodiment shown and described above, and their distance to each other does not have to be constant and is optimally determined depending on the form of the bottle. It is also possible to provide the connecting layers $m_3$, $m_4$ with an inclination or to use segments in the form of an approximate circle, an oval, a triangle or a leaf-like shape instead of quadrangular segments 3*a*. While the bottle according to the invention is molded in a blow molding process or an extrusion molding process, other molding processes can be also used.

While it is defined that the border of the barrel part 15 and the bottom part 16 of the bottle is located where the petal-shaped part starts in the present embodiment, it can be defined that the bottom part 16 starts from the part that is getting thicker than the barrel part 15, according to the teaching mentioned above for the arrangement of a gas barrier resin.

Although preferred embodiments of the present invention are described above, various alternations can be added within the scope of claims. For example, various structures used in each embodiment described above, can be combined depending on the purpose and the field of application.

The present invention is not restricted to food containers for drinks etc., but can be used for containers that are required to be equipped with the gas barrier properties for their contents.

What is claimed is:

1. A laminated bottle having a gas barrier resin layer arranged between an inner layer and an outer layer, the laminated bottle comprising:
   a mouth part onto which a cap is removably threaded;
   a neck part connected to the mouth part via an annular part, the neck part having a diameter identical with that of the mouth part;
   a shoulder part connected to the neck part and having a gradually enlarged diameter;
   a barrel part connected to the shoulder part; and
   a bottom part connected to the barrel part,
   wherein the gas barrier resin layer is segmented into a plurality of segments each having a surface area reduced with respect to that of the laminated bottle,
   wherein the plurality of segments of the gas barrier resin layer are arranged at a distance to each other at least in an area from the shoulder part to the barrel part of the laminated bottle, and
   wherein the gas barrier resin layer comprises a plurality of strip segments extending along an axis of the laminated bottle.

2. A laminated bottle according to claim 1, wherein the inner layer and the outer layer are composed of polyester resin, and
   wherein at least the area from the shoulder part to the barrel part of the laminated bottle comprises 3 layers.

3. A laminated bottle having a gas barrier resin layer arranged between an inner layer and an outer layer, the laminated bottle comprising:
   a mouth part onto which a cap is removably threaded;
   a neck part connected to the mouth part via an annular part, the neck part having a diameter identical with that of the mouth part;
   a shoulder part connected to the neck part and having a gradually enlarged diameter;
   a barrel part connected to the shoulder part; and
   a bottom part connected to the barrel part,
   wherein the gas barrier resin layer is segmented into a plurality of segments each having a surface area reduced with respect to that of the laminated bottle,
   wherein the plurality of segments of the gas barrier resin layer are arranged at a distance to each other at least in an area from the shoulder part to the barrel part of the laminated bottle, and
   wherein the gas barrier resin layer comprises a plurality of quadrangular segments with two sides extending in a direction along an axis of the laminated bottle and two other sides extending in a direction surrounding the axis of the laminated bottle.

4. A laminated bottle according to claim 3, wherein the inner layer and the outer layer are composed of polyester resin, and
   wherein at least the area from the shoulder part to the barrel part of the laminated bottle comprises 3 layers.

* * * * *